(12) United States Patent
Shehab (10) Patent No.: US 11,313,839 B2
(45) Date of Patent: Apr. 26, 2022

(54) APPARATUS, SYSTEM, AND METHOD FOR ULTRASONIC INSPECTION OF A VARIABLE RADIUS JOINT

(71) Applicant: The Boeing Company, Chicago, IL (US)

(72) Inventor: Kareem Shehab, Seattle, WA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 16/716,135

(22) Filed: Dec. 16, 2019

(65) Prior Publication Data
US 2021/0181160 A1 Jun. 17, 2021

(51) Int. Cl.
*G01N 29/28* (2006.01)
*G01N 29/265* (2006.01)

(52) U.S. Cl.
CPC ........... *G01N 29/265* (2013.01); *G01N 29/28* (2013.01); *G01N 2291/263* (2013.01)

(58) Field of Classification Search
CPC .. G01N 29/225; G01N 29/265; G01N 29/043; G01N 29/28; G01N 2291/044; G01N 2291/263
USPC ......................................................... 73/620
See application file for complete search history.

(56) References Cited

U.S. PATENT DOCUMENTS

| | | | | |
|---|---|---|---|---|
| 7,263,889 B2* | 9/2007 | Kennedy | ............. | G01N 29/265 73/620 |
| 7,836,768 B2* | 11/2010 | Young | ................. | G01N 29/225 73/620 |
| 9,746,447 B2* | 8/2017 | Fetzer | .................... | G01N 29/28 |
| 10,184,916 B2 | 1/2019 | Sarr et al. | | |
| 10,520,474 B2* | 12/2019 | De Frutos-Galindo | ... | B64F 5/60 |
| 10,690,632 B2* | 6/2020 | Tissenier | ............... | G01D 11/30 |
| 10,782,268 B2* | 9/2020 | Kahmann | ............ | G01N 29/043 |
| 11,035,831 B1* | 6/2021 | Fetzer | ................. | G01N 29/265 |
| 2009/0107244 A1* | 4/2009 | Fetzer | .................. | G01N 29/225 73/635 |
| 2016/0123934 A1* | 5/2016 | Fetzer | .................. | G01N 29/265 73/625 |

FOREIGN PATENT DOCUMENTS

EP 002159576 A1 * 3/2010 ............. G01N 29/28

OTHER PUBLICATIONS

U.S. Appl. No. 17/368,557, filed Jul. 6, 2021.

* cited by examiner

*Primary Examiner* — Jacques M Saint Surin
(74) *Attorney, Agent, or Firm* — Kunzler Bean & Adamson (57) ABSTRACT

Disclosed herein is an apparatus for ultrasonic inspection that comprises a base and a contact shoe that is located within the base and movably coupled to the base. The apparatus additionally comprises a sensor carriage located within the contact shoe and movably coupled to the contact shoe such that the sensor carriage is translationally movable relative to the contact shoe. The apparatus further comprises a linkage pivotably coupled to the base at a base pivot point, pivotably coupled to the contact shoe at a shoe pivot point, and pivotably coupled to the sensor carriage at a carriage pivot point. Translational movement of the contact shoe relative to the base causes the linkage to pivot about the base pivot point, the shoe pivot point, and the carriage pivot point and move the sensor carriage relative to the base and the contact shoe.

20 Claims, 9 Drawing Sheets

APPARATUS, SYSTEM, AND METHOD FOR ULTRASONIC INSPECTION OF A VARIABLE RADIUS JOINT

FIELD

This disclosure relates generally to ultrasonic inspection, and more particularly to ultrasonic inspection of variable radius joints.

BACKGROUND

Parts of vehicles, buildings, devices, and the like, may have structural abnormalities. Such abnormalities may be detected using non-destructive inspection techniques, such as those that use ultrasonic signals. Detection of abnormalities helps to ensure the quality of a part, improve manufacturing techniques, or assist in material selection. However, detecting abnormalities of variable radius joints using ultrasonic inspection techniques can be difficult. For instance, many inspection apparatuses used for inspecting variable radius joints change a focal length of an ultrasonic array either prematurely or too late after the radius of a joint has changed. Further, many inspection apparatuses require manual adjustment to maintain proper inspection distances in response to a change in a geometry of a part such as a joint radius or angle. Manual adjustment can impact time required to perform the inspection, introduce user error, and otherwise degrade inspection quality and efficiency.

SUMMARY

The subject matter of the present application has been developed in response to the present state of the art, and in particular, in response to the shortcomings of current ultrasonic inspection for variable radius joints, that have not yet been fully solved by currently available techniques. Accordingly, the subject matter of the present application has been developed to provide ultrasonic inspection of variable radius joints that overcomes at least some of the above-discussed shortcomings of prior art techniques.

The following is a non-exhaustive list of examples, which may or may not be claimed, of the subject matter, disclosed herein.

Disclosed herein is an apparatus for ultrasonic inspection. The apparatus comprises a base that comprises a first part contact surface. The apparatus also comprises a contact shoe located within the base and movably coupled to the base such that the contact shoe is translationally movable relative to the base. The apparatus additionally comprises a sensor carriage located within the contact shoe and movably coupled to the contact shoe such that the sensor carriage is translationally movable relative to the contact shoe. The apparatus further comprises a linkage pivotably coupled to the base at a base pivot point, pivotably coupled to the contact shoe at a shoe pivot point, and pivotably coupled to the sensor carriage at a carriage pivot point. Translational movement of the contact shoe relative to the base causes the linkage to pivot about the base pivot point, the shoe pivot point, and the carriage pivot point and move the sensor carriage relative to the base and the contact shoe. The preceding subject matter of this paragraph characterizes example 1 of the present disclosure.

The shoe pivot point is disposed between the base pivot point and the carriage pivot point to be at a first distance from the base pivot point and second distance from the carriage pivot point such that the translational movement of the contact shoe relative to the base is less than the movement of the sensor carriage relative to the base. The preceding subject matter of this paragraph characterizes example 2 of the present disclosure, wherein example 2 also includes the subject matter according to example 1, above.

The apparatus further comprises an ultrasonic unit mounted to the sensor carriage such that the ultrasonic unit is non-movable relative to the sensor carriage. The preceding subject matter of this paragraph characterizes example 3 of the present disclosure, wherein example 3 also includes the subject matter according to any one of examples 1-2, above.

Movement of the sensor carriage relative to the base adjusts a focal point of the ultrasonic unit relative to the base. The preceding subject matter of this paragraph characterizes example 4 of the present disclosure, wherein example 4 also includes the subject matter according to example 3, above.

The first part contact surface of the base comprises a first portion and a second portion, which is angled relative to the first portion, the contact shoe further comprising a second part contact surface, non-movably fixed to the contact shoe. The second part contact surface is a curved surface. The preceding subject matter of this paragraph characterizes example 5 of the present disclosure, wherein example 5 also includes the subject matter according to any one of examples 1-4, above.

The first part contact surface and the second part contact surface are configured to be slidable along a surface being inspected and the contact shoe is configured to move translationally relative to the base in response to the contact shoe being displaced while sliding. The preceding subject matter of this paragraph characterizes example 6 of the present disclosure, wherein example 6 also includes the subject matter according to example 5, above.

The linkage comprises a plurality of links. Each of the plurality of links is oriented parallel to the other links when the contact shoe and the sensor carriage are in a first position relative to the base and at least one of the plurality of links is angled relative to another of the plurality of links when the contact shoe and the sensor carriage are in a second position relative to the base. The preceding subject matter of this paragraph characterizes example 7 of the present disclosure, wherein example 7 also includes the subject matter according to any one of examples 1-6, above.

The apparatus further comprises a biasing element in biasing engagement with the sensor carriage to bias the sensor carriage toward the first position relative to the base. The preceding subject matter of this paragraph characterizes example 8 of the present disclosure, wherein example 8 also includes the subject matter according to example 7, above.

Two of the plurality of links are coupled to the base at corresponding base pivot points proximal a base central axis of the base and along one side of the base. Another two of the plurality of links are coupled to the base at corresponding base pivot points proximal the base central axis along an opposite side of the base. The preceding subject matter of this paragraph characterizes example 9 of the present disclosure, wherein example 9 also includes the subject matter according to any one of examples 7-8, above.

The apparatus further comprises a fluid port formed in the contact shoe and configured to facilitate fluid contact at an ultrasonic unit of the sensor carriage. The preceding subject matter of this paragraph characterizes example 10 of the present disclosure, wherein example 10 also includes the subject matter according to any one of examples 1-9 above.

Further discloses herein is a system for ultrasonic inspection. The system comprises an apparatus that comprises a base. The base comprises a first part contact surface. The apparatus also comprises a contact shoe located within the base and movably coupled to the base such that the contact shoe is translationally movable relative to the base. The apparatus further comprises a sensor carriage located within the contact shoe and movably coupled to the contact shoe such that the sensor carriage is translationally movable relative to the contact shoe. The sensor carriage comprises an ultrasonic unit. The apparatus additionally comprises a linkage pivotably coupled to the base at a base pivot point, pivotably coupled to the contact shoe at a shoe pivot point, and pivotably coupled to the sensor carriage at a carriage pivot point. Translational movement of the contact shoe relative to the base causes the linkage to pivot about the base pivot point, the shoe pivot point, and the carriage pivot point and move the sensor carriage relative to the base and the contact shoe. The system also comprises a tool to receive the apparatus and position the apparatus to provide an ultrasonic signal from the ultrasonic unit and detect a reflected ultrasonic signal at the ultrasonic unit. The system further comprises a processing unit configured to process the reflected ultrasonic signal received by the ultrasonic unit to determine a presence of an abnormality corresponding to the positioning of the apparatus. The preceding subject matter of this paragraph characterizes example 11 of the present disclosure.

The tool is configured to position the apparatus using a sliding motion. The preceding subject matter of this paragraph characterizes example 12 of the present disclosure, wherein example 12 also includes the subject matter according to example 11, above.

The sliding motion is in a sliding direction and the contact shoe and sensor carriage are translationally movable in a displacement direction which is non-parallel to the sliding direction. The preceding subject matter of this paragraph characterizes example 13 of the present disclosure, wherein example 13 also includes the subject matter according to example 12, above.

The tool supplies an ultrasonic fluid to a fluid port of the apparatus. The preceding subject matter of this paragraph characterizes example 14 of the present disclosure, wherein example 14 also includes the subject matter according to any one of examples 11-13 above.

The tool comprises a robot. The preceding subject matter of this paragraph characterizes example 15 of the present disclosure, wherein example 15 also includes the subject matter according to any one of examples 11-14 above.

Additionally disclosed herein is a method of ultrasonic testing. The method comprises positioning an apparatus on a part at a joint of the part to contact a first part contact surface of a base of the apparatus with the part and to contact a second part contact surface of a contact shoe of the apparatus at a first radius of the joint. The method also comprises emitting an ultrasonic signal from the apparatus to a focal point proximate the joint of the part. The method further comprises sliding the apparatus along the joint of the part with the first part contact surface in contact with the part. The method additionally comprises moving the contact shoe of the apparatus relative to a base of the apparatus in response to the second part contact surface of the contact shoe contacting a second radius of the joint. The method also comprises actuating a linkage in response to movement of the contact shoe to move a sensor carriage of the apparatus to adjust a position of the focal point of the ultrasonic signal based on the second radius, the second radius being different from the first radius. The preceding subject matter of this paragraph characterizes example 16 of the present disclosure.

The contact shoe moves a shoe translation distance and the sensor carriage moves a carriage translation distance that is greater than the shoe translation distance. The preceding subject matter of this paragraph characterizes example 17 of the present disclosure, wherein example 17 also includes the subject matter according to example 16, above.

The shoe translation distance corresponds to the carriage translation distance based on a shoe pivot point and a carriage pivot point along at least one link of the linkage. The preceding subject matter of this paragraph characterizes example 18 of the present disclosure, wherein example 18 also includes the subject matter according to example 17, above.

Actuating the linkage further comprises pivoting the linkage about a base pivot point of the base in response to the movement of the contact shoe. The preceding subject matter of this paragraph characterizes example 19 of the present disclosure, wherein example 19 also includes the subject matter according to any one of examples 16-18 above.

The method further comprises continuously testing the joint through a transition from the first radius to the second radius. The preceding subject matter of this paragraph characterizes example 20 of the present disclosure, wherein example 20 also includes the subject matter according to any one of examples 16-19 above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
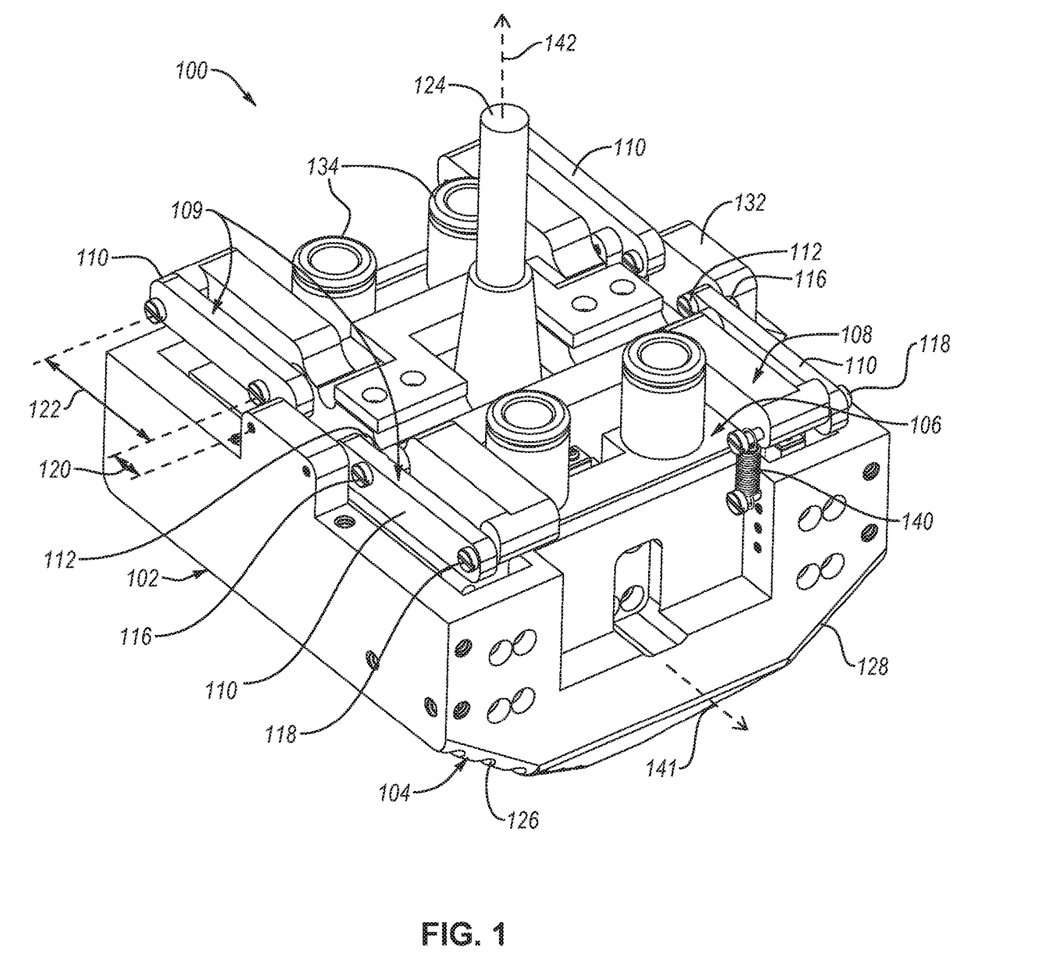
FIG. 1 illustrates a perspective view of an apparatus for ultrasonic inspection, according to one or more examples of the present disclosure.

FIG. 1 illustrates an apparatus 100 for ultrasonic inspection. The apparatus 100 includes a base 102. The base 102 includes a first part contact surface 104. The first part contact surface 104 is formed on a bottom of the base 102 and positioned to contact a part 402 (see FIGS. 4A-4B). The base 102 is shown as generally rectangular but can be non-rectangular. The base 102 includes one or more mounting locations, ports, or other features. For example, as shown, the base 102 includes a base mounting point 132. The base mounting point 132, as shown, extends from the base 102 to provide for coupling of a linkage 109 to the base 102.

The base 102 is sized to receive a contact shoe 106 and a sensor carriage 108 of the apparatus 100. The contact shoe 106 is located within the base 102 and is movably coupled to the base 102 such that the contact shoe 106 is translationally movable relative to the base 102. The contact shoe 106 is sized to nest into the base 102 and translate relative to the base in a displacement direction 142. The contact shoe 106 includes one or more shoe mounting points 136 (see, e.g., FIG. 2). The shoe mounting points 136 may extend from the contact shoe 106 to facilitate coupling of the linkage 109 to the contact shoe 106.

The sensor carriage 108 is located within the contact shoe 106 and is movably coupled to the contact shoe 106 such that the sensor carriage 108 is translationally movable relative to the contact shoe 106 and the base 102 in the displacement direction 142. The sensor carriage 108 is sized to nest into the contact shoe 106 with the contact shoe 106 nested into the base 102. The sensor carriage 108 is coupled to the contact shoe 106 and the base 102 via a linkage 109. The sensor carriage 108 further includes carriage mounting points 138 which facilitate coupling of the linkage 109 to the sensor carriage 108. Each of the base mounting points 132, shoe mounting points 136, and carriage mounting points 138 are disposed symmetrically about a base central axis 130, in some examples, but in other examples, they are arranged non-symmetrically on the corresponding components.

The linkage 109 is pivotably coupled to the base 102 at a base pivot point 112 of the base 102. The linkage 109 is pivotably coupled to the contact shoe 106 at a shoe pivot point 116 of the contact shoe 106. The linkage 109 is also pivotably coupled to the sensor carriage 108 at a carriage pivot point 118 of the sensor carriage 108. Translational movement of the contact shoe 106 relative to the base 102 causes the linkage 109 to pivot about the base pivot point 112 translating the shoe pivot point 116 and the carriage pivot point 118 and moving the sensor carriage 108 relative to the base 102 and the contact shoe 106.

Figure 6:
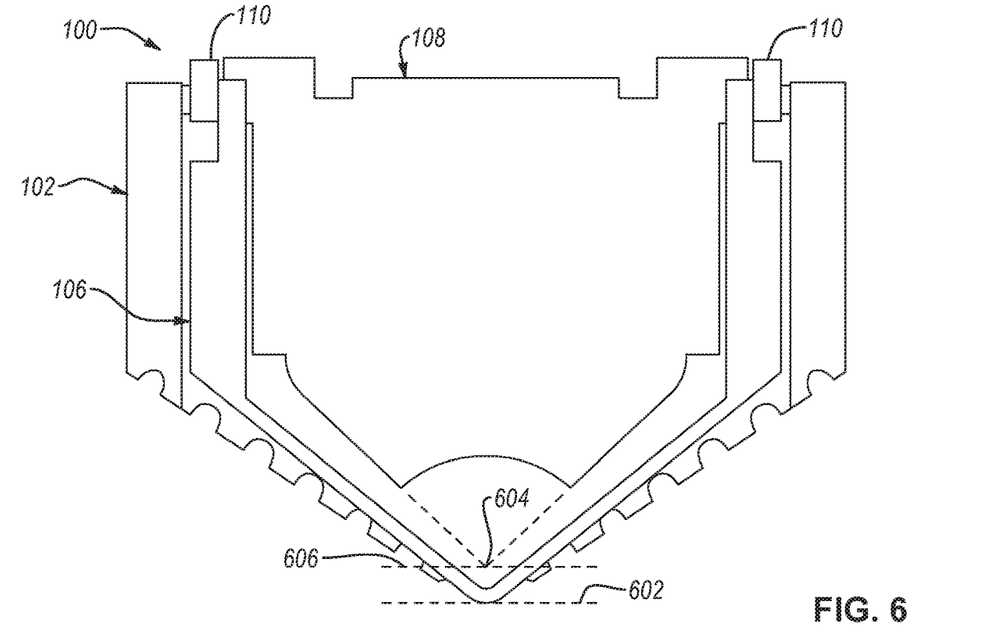
FIG. 6 illustrates a cross-sectional side elevation view of the apparatus of FIG. 1, with the contact shoe and the sensor carriage in a first position relative to the base, according to one or more examples of the present disclosure.

Movement of the contact shoe 106 and the sensor carriage 108 is biased by a biasing element 140 in the illustrated example. The biasing element 140 applies a force, which biases the contact shoe 106 and the sensor carriage 108 toward a first position in which sensor carriage 108 is fully nested within the contact shoe 106 and the contact shoe 106 is fully nested within the base 102, as shown in FIGS. 1 and 6.

Although, in the illustrated example, the linkage 109 includes four separate links 110 positioned at corresponding corners of the apparatus 100, fewer or more links 110 may be used to facilitate movement of the contact shoe 106 and the sensor carriage 108. The linkage 109 may include through-holes, blind-holes, posts, or the like to facilitate connection with at least one of the base 102, the contact shoe 106, and the sensor carriage 108. The linkage 109 is shown as being disposed within the base 102 and outside of the contact shoe 106 and the sensor carriage 108. Alternatively, the placement of the linkage 109 may be changed or adjusted relative to one or more of the base 102, the contact shoe 106, and the sensor carriage 108.

In the illustrated example, each link 110 of the linkage 109 has a similar or identical geometry. While the geometry is shown as elongated, the linkage 109 may take other shapes or form factors. The shoe pivot point 116 is disposed on the linkage 109 between the base pivot point 112 and the carriage pivot point 118 on each corresponding link 110. The shoe pivot point 116 is disposed in the link 110 to be at a first distance 120 from the base pivot point 112. The shoe pivot point 116 is also a second distance 122 from the carriage pivot point 118. The difference between the first distance 120 and the second distance 122 provides a translational movement of the contact shoe 106 relative to the base 102 that is less than a movement of the sensor carriage 108 relative to the base 102.

As the contact shoe 106 moves in response to an input force, the contact shoe 106 moves relative to the base 102. The translational movement of the contact shoe 106 relative to the base 102 actuates the linkage 109 which moves the sensor carriage 108 relative to the base 102. The difference in movement of the contact shoe 106 and the sensor carriage 108 provides for improved inspection accuracy as the apparatus 100 is passed over a part.

In particular, an ultrasonic unit 124 may be mounted to the sensor carriage 108. In one example, the ultrasonic unit 124 is disposed at least partially within a sensor notch 206 formed in the sensor carriage 108 (see, e.g., FIG. 2). The ultrasonic unit 124 may be non-movable relative to the sensor carriage 108. In other words, the ultrasonic unit 124 may be coupled to the sensor carriage 108 such that the ultrasonic unit 124 moves as the sensor carriage 108 moves. Although the ultrasonic unit 124 utilizes ultrasonic signals for inspection, in other examples, the ultrasonic unit 124 can be replaced with a unit that utilizes other types of signals for inspection, such as optical, x-ray, electron, or other imaging or inspection signals.

As seen in FIG. 6, movement of the sensor carriage 108 with the ultrasonic unit 124 coupled thereto allows for a focal point 604 of the ultrasonic unit 124 to be adjusted or move relative to the base 102. Adjustment of the focal point 604 provides a consistent alignment for continuous inspection. This provides for automatic response and adjustment of the apparatus 100 to changes in a geometry of a part at a joint or other region to be inspected.

In some examples, the ultrasonic unit 124 is positioned on the sensor carriage 108 to be centrally located on the apparatus 100. In alternative examples, other positions and alignments of the ultrasonic unit 124 are used. The ultrasonic unit 124 includes an array of ultrasonic elements, in certain examples, or includes a single ultrasonic element, in other examples. The ultrasonic unit 124 both emits and detects ultrasonic energy in certain examples. Alternatively, in other examples, the ultrasonic unit 124 has one or more dedicated emitters and dedicated detectors.

Referring back to FIG. 1, the apparatus 100 includes one or more fluid ports 134. The fluid ports 134 facilitate the introduction of fluid and fluid contact at the ultrasonic unit 124. For example, the fluid ports 134 are coupled to a fluid supply. Fluid from the fluid supply and provided to the fluid ports 134 is discharged at an interface between the ultrasonic unit 124 and the part being inspected to provide an improved ultrasonic coupling with the part at the ultrasonic unit 124. Accordingly, fluid provided by the fluid ports 134 helps facilitate improved resolution, reduced artifacts, or otherwise improved imaging by the ultrasonic unit 124. While four fluid ports 134 are shown, more or fewer fluid ports 134 may be included. Additionally, the fluid ports 134 may be arranged as shown or in other arrangements to supply fluid to the ultrasonic unit 124.

The first part contact surface 104 of the base 102 includes a first portion 126 and a second portion 128. The second portion 128 is angled relative to the first portion 126. While each of the first portion 126 and the second portion 128 are shown as planar and angled, each of the first portion 126 and the second portion 128 may be linear, curved, have a complex geometry, or the like. In some embodiments, the geometry of the first part contact surface 104 may be configured to work with a range of part geometries. Alternatively, the first part contact surface 104 may be configured to closely match a specific part geometry. For example, the first portion 126 and the second portion 128 are shown as being angled to converge outward in a convex arrangement. This suits the apparatus 100 for use on an inside radius or joint. Alternatively, the apparatus 100 may be configured with the first portion 126 and the second portion 128 angled together in an inverted or concave manner to provide for inspection of an outside corner or joint. Additionally, the first portion 126 and the second portion 128 of the first part contact surface 104 may be symmetrical or asymmetrical relative to one another.

The first portion 126 and the second portion 128 may converge at any of a broad range of angles. The angle of convergence of the first portion 126 and the second portion 128 may be adapted to a specific application such as a joint angle or angle of some other part for which the apparatus 100 is used to inspect. In some embodiments, the base 102 has a specific angle adapted for a specific part or feature of the part and the base 102 is interchangeable on the apparatus 100 to facilitate use of bases 102 with at least first part contact surfaces 104 having different geometries.

Figure 2:
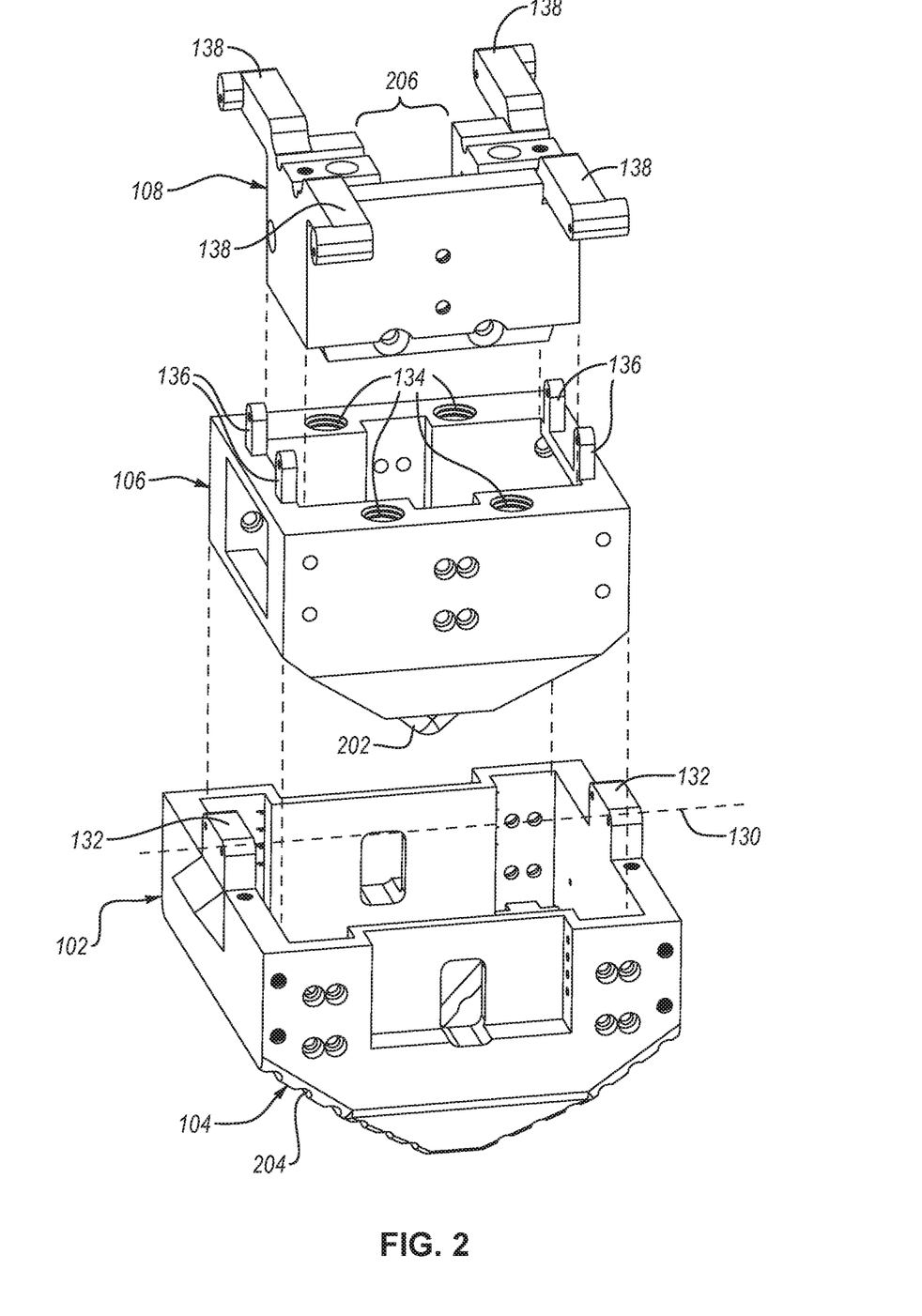
FIG. 2 illustrates an upper perspective of an exploded view of a base, contact shoe, and sensor carriage of the apparatus of FIG. 1, according to one or more examples of the present disclosure.
Figure 3:
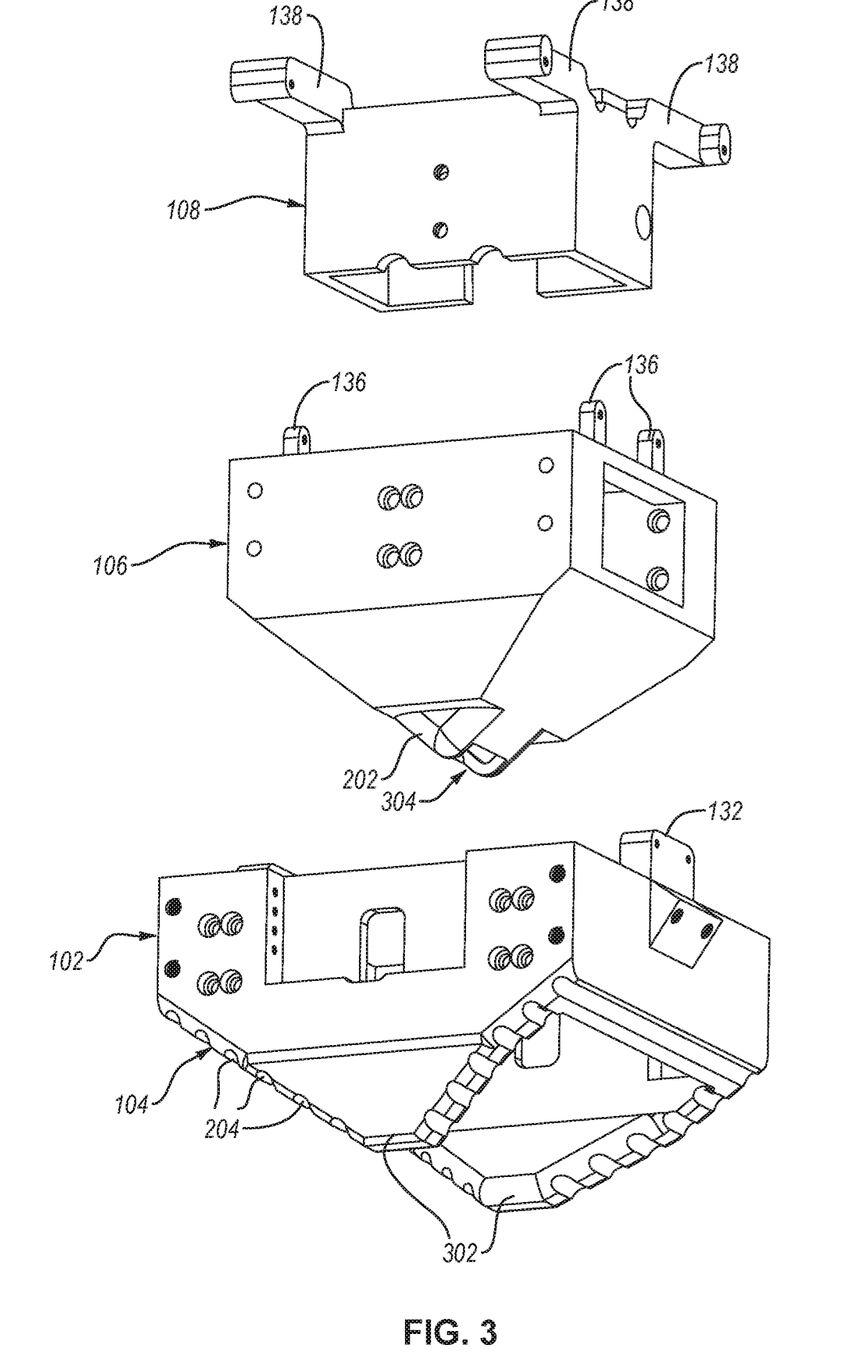
FIG. 3 illustrates a lower perspective of an exploded view of the base, contact shoe, and sensor carriage of the apparatus of FIG. 1, according to one or more examples of the present disclosure.

The first part contact surface 104 may include grooves 204, as shown in FIGS. 2 and 3. Alternatively, the first part contact surface 104 may include other shape features, surface treatments, and/or coatings. Features of the first part contact surface 104, such as the grooves 204, may allow for ultrasonic fluid to pass the first part contact surface 104. Features of the first part contact surface 104 may facilitate movement of the apparatus 100 along a surface of a part 402.

As shown in FIGS. 2 and 3, the contact shoe 106 includes a second part contact surface 202. With the contact shoe 106 nested into the base 102, the second part contact surface 202 extends through the base 102 to partially align with the first part contact surface 104. As the second part contact surface 202 contacts a surface of a part 402, the contact shoe 106 is pressed up translating the contact shoe 106 relative to the base 102. The second part contact surface 202 may be exposed relative to the base 102 by a cutoff 302 of the first part contact surface 104 of the base 102. As shown, the cutoff 302 is a flattened region of the first part contact surface 104 between the first portion 126 and the second portion 128. The cutoff 302 may also have other non-flat geometries.

The contact shoe 106 includes an inspection aperture 304 formed in the contact shoe 106 and located in the second part contact surface 202 of the contact shoe 106. The inspection aperture 304 allows for passage of ultrasonic or other inspection energy between the apparatus 100 and a part 402 for inspection. The inspection aperture 304 may be centrally located or positioned off-center to align with a positioning of the ultrasonic unit 124.

Figure 5:
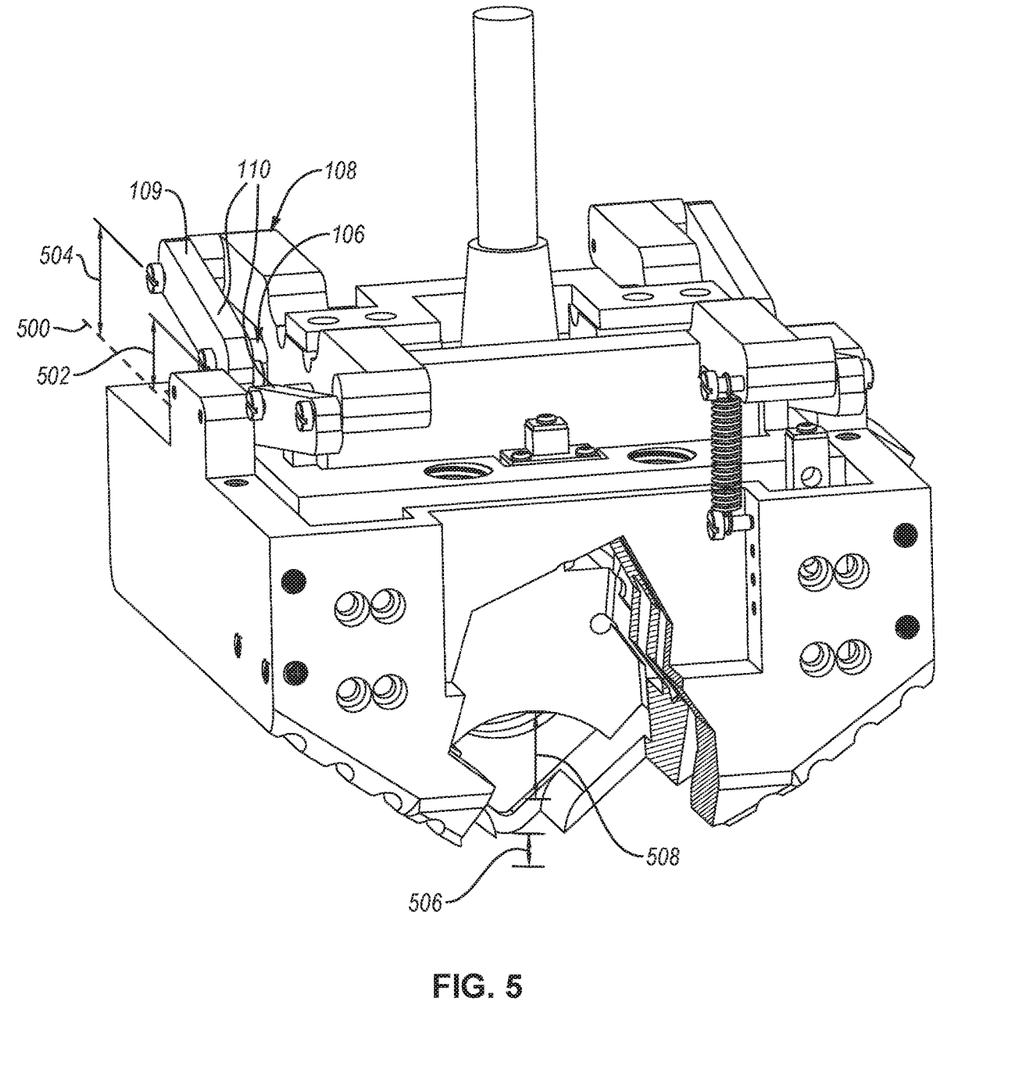
FIG. 5 illustrates a perspective view of the apparatus of FIG. 1, with the contact shoe and the sensor carriage in a second position relative to the base, according to one or more examples of the present disclosure.

As shown in FIG. 5, movement of the contact shoe 106 relative to the base 102 pivots the linkage 109 about the base pivot point 112 of the linkage 109. Pivoting of the linkage 109 about the base pivot point 112 rotates the linkage 109 at the shoe pivot point 116 of the contact shoe 106 and the carriage pivot point 118 of the sensor carriage 108. This movement results in a second contact surface displacement 506. Displacement of the contact shoe 106 by a shoe translation distance 502 at the shoe pivot point 116 moves the sensor carriage 108 by a carriage translation distance 504 at the carriage pivot point 118 relative to a first position 500 of the corresponding link 110. This results in an equivalent carriage displacement 508.

As shown in FIG. 1, the shoe pivot point 116 is separated from the base pivot point 112 by a first distance 120 and the carriage pivot point 118 is separated from the shoe pivot point 116 by a second distance. Based on the relative positioning of the base pivot point 112, the shoe pivot point 116, and the carriage pivot point 118 on the linkage, translational movement of the contact shoe 106 relative to the base 102 is less than the translational movement of the sensor carriage 108 relative to the base 102.

Figure 7:
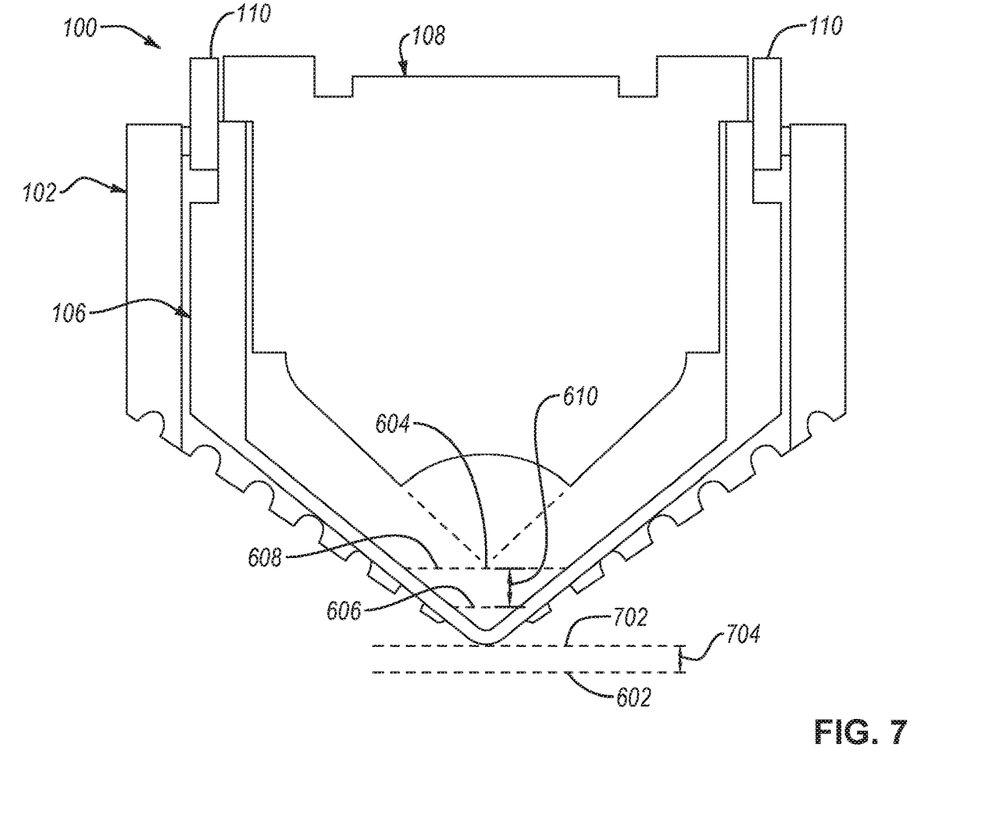
FIG. 7 illustrates a cross-sectional side elevation view of the apparatus of FIG. 1, with the contact shoe and the sensor carriage in a second position relative to the base, according to one or more examples of the present disclosure.

Referring now to FIGS. 6 and 7, the relative movement of the contact shoe 106 and the sensor carriage 108 adjust the focal point 604 of an ultrasonic or other sensor of the sensor carriage 108. As shown, the contact shoe displacement distance 704 from a first position 602 to a second position 702 causes a corresponding focal point displacement distance 610 from a first focal plane 606 to a second focal plane 608. This adjustability of the focal point 604 allows for the apparatus 100 to be moved over a non-uniform surface without interrupting inspection to manually adjust the focal point 604 to maintain inspection resolution and integrity.

Figure 4A:
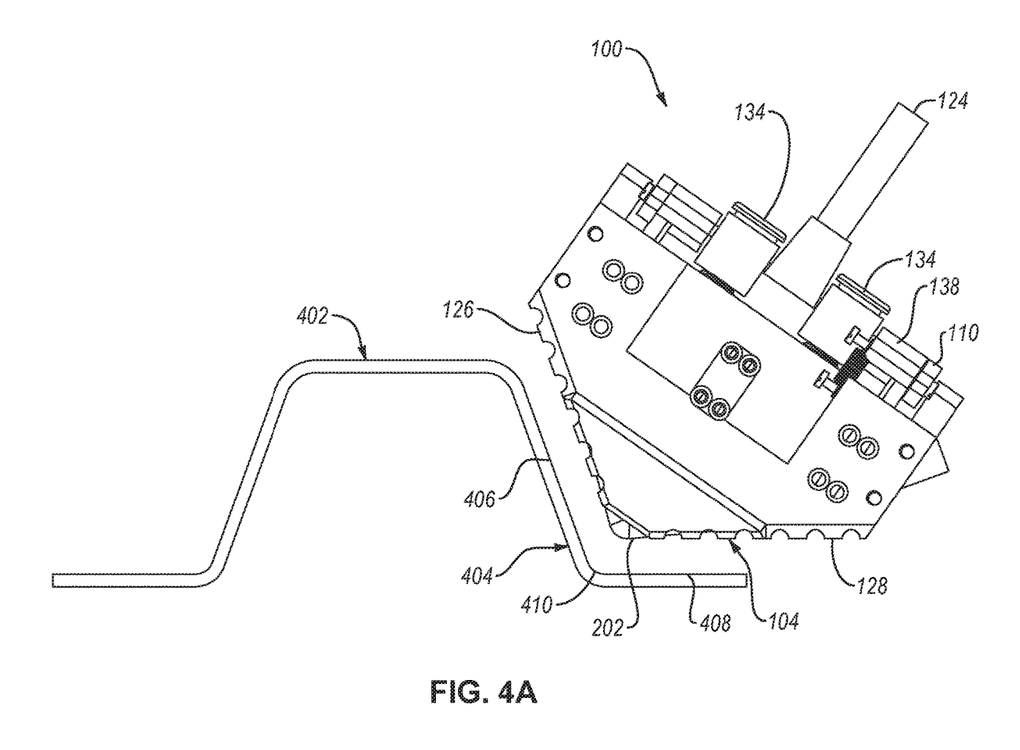
FIGS. 4A-B illustrate a side elevation view of the apparatus of FIG. 1, positioned relative to a part under inspection, according to one or more examples of the present disclosure.
Figure 4B:
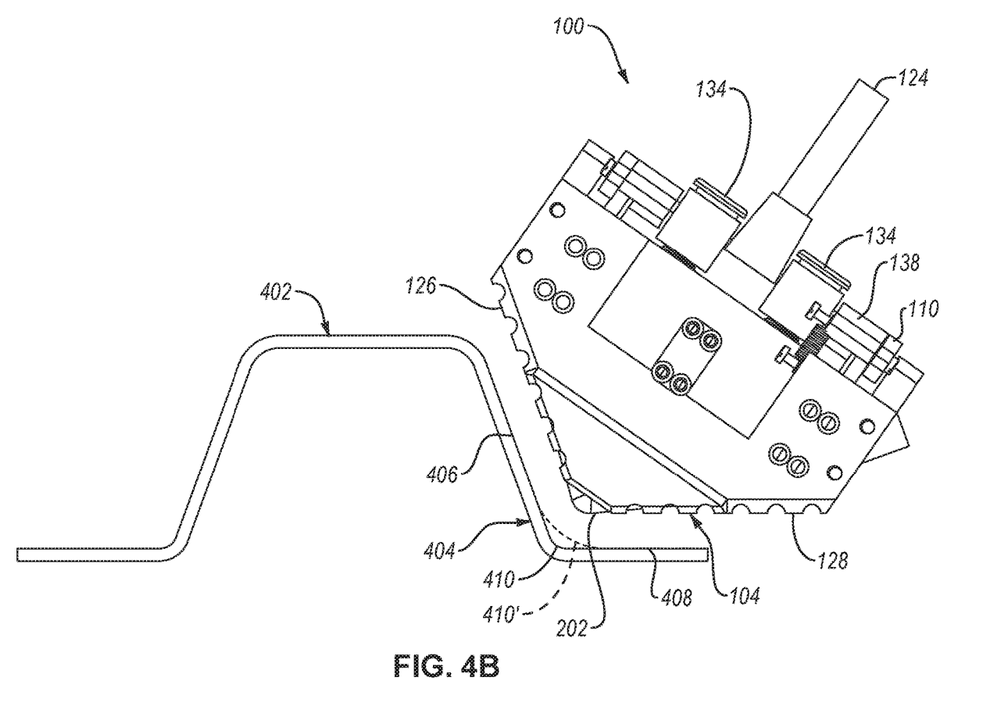

Referring to FIGS. 4A and 4B, the apparatus 100 is shown relative to a part 402. The part 402 includes a joint 404. The joint 404 is formed by a first part surface 406 and a second part surface 408. The first part surface 406 and the second part surface 408 come together to form a radius 410. In FIG. 4A, the apparatus 100 is positioned on the part 402 with the second part contact surface 202 of the apparatus 100 contacting the first radius 410 of the joint 404. The first portion 126 of the first part contact surface 104 of the apparatus 100 contacts the first part surface 406 of the part 402 and the second portion 128 contacts the second part surface 408. In this manner, the apparatus 100 may be moved along a length of the joint 404 to perform continuous inspection of the part 402 at the joint 404. A change in the joint 404 from a first radius 410 to a second radius 410' (as shown in FIG. 4B), different from the first radius 410, may apply a force to the second part contact surface 202 of the apparatus 100 and adjust the relative arrangement of the apparatus 100 to continue inspection of the part 402 across the variation from the first radius 410 to the second radius 410'. While the change from the first radius 410 to the second radius 410' is shown in FIGS. 4A and 4B is shown as going from a smaller radius to a larger radius, the transition between the two may also be the reverse. Additionally, the adjustability of the apparatus 100 facilitates inspection across changes in the relative angle of the first part surface 406 and the second part surface 408.

Figure 8:
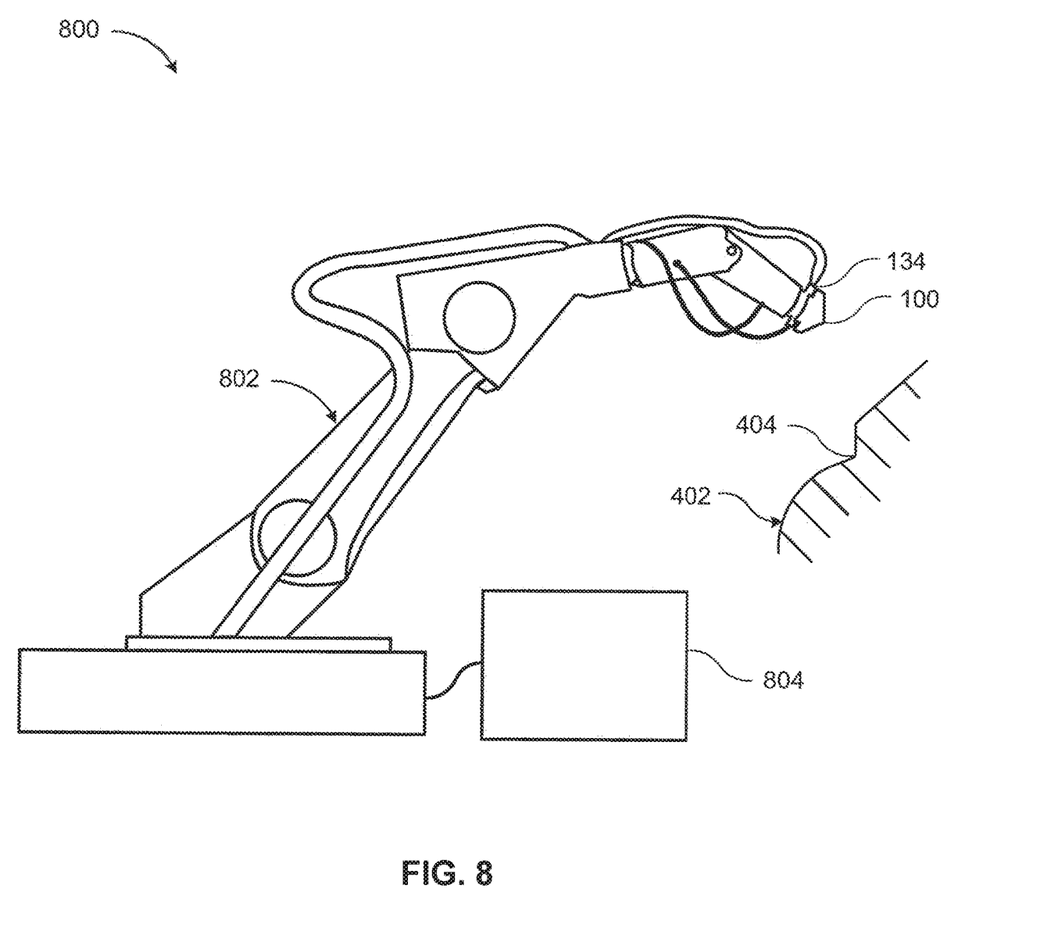
FIG. 8 illustrates a system for ultrasonic inspection, according to one or more examples of the present disclosure.

Referring to FIG. 8, the apparatus 100 is implemented in a system 800, which includes the apparatus 100, a tool 802, and a processing unit 804. The tool 802 receives the apparatus 100 and positions the apparatus 100 to provide an ultrasonic signal from the ultrasonic unit 124 and to detect a reflected ultrasonic signal at the ultrasonic unit 124. The tool 802 is configured to position the apparatus 100 on a part 402 to be inspected. For example, the tool 802 may position the apparatus 100 at or near a joint 404 of the part 402 and move the apparatus 100 along the joint 404 to perform a continuous or intermittent inspection of the joint 404. In some examples, the tool 802 is configured to position the apparatus 100 using a sliding motion. In some examples, the sliding motion is in a sliding direction 141 and the contact shoe 106 and the sensor carriage 108 are translationally movable in a displacement direction 142 which is non-parallel to the sliding direction 141.

If changes in the joint 404, such as changes in the radius or relative angle of the joint surfaces, are encountered, the tool 802 is thus adapted to continue uninterrupted across the joint 404. While the illustrated example of the tool 802 is a robotic arm, other manual or semi-manual arrangements may be used. The tool 802 may include fluid, electronic, or other communication to and/or from the apparatus 100. In some examples, the tool 802 supplies an ultrasonic fluid to a fluid port 134 of the apparatus 100.

The processing unit 804 is configured to process the reflected ultrasonic signal received by the ultrasonic unit at the apparatus 100 to determine the presence of an abnormality corresponding with the positioning of the apparatus 100 relative to the part. In this manner, an abnormality in the joint 404 arising from manufacture of the materials or the joint 404 itself, and the location of the abnormality, may be detected.

Figure 9:
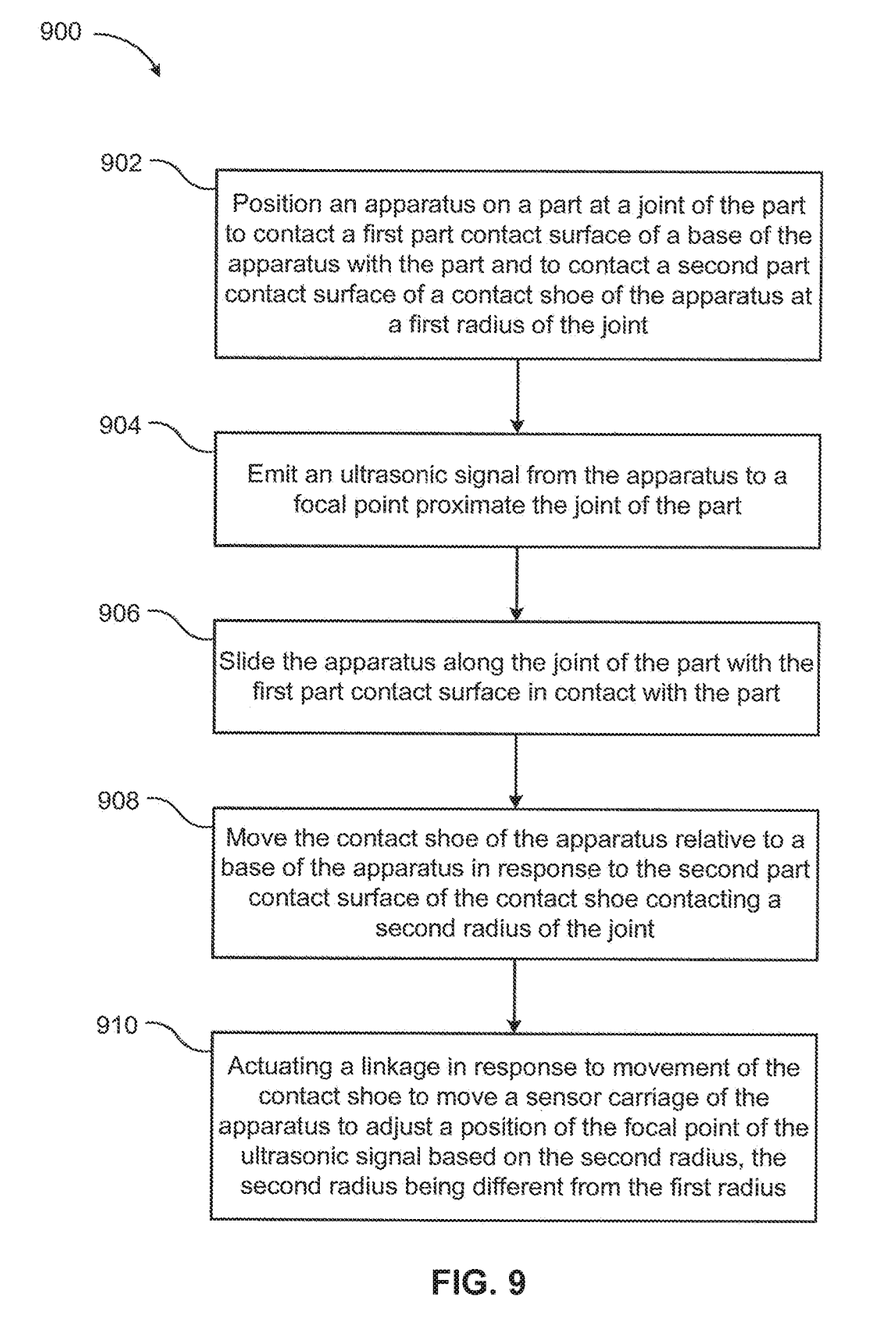
FIG. 9 illustrates a schematic flow chart of a method of ultrasonic inspection, according to one or more examples of the present disclosure.

FIG. 9 illustrates a method 900 of ultrasonic testing. The method 900 includes positioning 902 an apparatus 100 on a part 402 at a joint 404 of the part 402 to contact a first part contact surface 104 of a base 102 of the apparatus 100 with the part 402 and to contact a second part contact surface 202 of a contact shoe 106 of the apparatus 100 at a first radius 410 of the joint 404. The method 900 also includes emitting 904 an ultrasonic signal from the apparatus 100 to a focal point 604 proximate the joint 404 of the part 402 and sliding the apparatus 100 along the joint 404 of the part 402 with the first part contact surface 104 in contact with the part 402.

The method 900 further includes moving 908 the contact shoe 106 of the apparatus 100 relative to a base 102 of the apparatus 100 in response to the second part contact surface 202 of the contact shoe 106 contacting a second radius 410' of the joint 404. The method 900 additionally includes actuating 910 a linkage 109 in response to movement of the contact shoe 106 to move a sensor carriage 108 of the apparatus 100 to adjust a position of the focal point 604 of the ultrasonic signal based on the second radius 410. The second radius 410' is different from the first radius 410. In some examples of the method 900, the contact shoe 106 moves a shoe translation distance 502 and the sensor carriage 108 moves a carriage translation distance 504 that is greater than the shoe translation distance 502. In some examples of the method 900, the shoe translation distance 502 corresponds to the carriage translation distance 504 based on the shoe pivot point 116 and the carriage pivot point 118 along at least one link 110 of the linkage 109.

In some examples of the method 900, actuating the linkage 109 involves pivoting the linkage 109 about a base pivot point 112 of the base 102 in response to the movement of the contact shoe 106. Examples of the method 900 may also include continuously testing the joint 404 through a transition from the first radius to the second radius 410'.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An apparatus for ultrasonic inspection, the apparatus comprising:
a base comprising a first part contact surface;
a contact shoe located within the base in a nested arrangement with the base and movably coupled to the base such that the contact shoe is translationally movable relative to the base;
a sensor carriage located within the contact shoe in a nested arrangement with the contact shoe and movably coupled to the contact shoe such that the sensor carriage is translationally movable relative to the contact shoe; and
a linkage pivotably coupled to the base at a base pivot point, pivotably coupled to the contact shoe at a shoe pivot point, and pivotably coupled to the sensor carriage at a carriage pivot point, wherein translational movement of the contact shoe relative to the base causes the linkage to pivot about the base pivot point, the shoe pivot point, and the carriage pivot point and move the sensor carriage relative to the base and the contact shoe.

2. The apparatus of claim 1, wherein the shoe pivot point is disposed between the base pivot point and the carriage pivot point to be at a first distance from the base pivot point and second distance from the carriage pivot point such that the translational movement of the contact shoe relative to the base is less than the movement of the sensor carriage relative to the base.

3. The apparatus of claim 1, further comprising an ultrasonic unit mounted to the sensor carriage such that the ultrasonic unit is non-movable relative to the sensor carriage.

4. The apparatus of claim 3, wherein movement of the sensor carriage relative to the base adjusts a focal point of the ultrasonic unit relative to the base.

5. The apparatus of claim 1, wherein the first part contact surface of the base comprises a first portion and a second portion, which is angled relative to the first portion, the contact shoe further comprising a second part contact surface, non-movably fixed to the contact shoe, wherein the second part contact surface is a curved surface.

6. The apparatus of claim 5, wherein the first part contact surface and the second part contact surface are configured to be slidable along a surface being inspected and the contact shoe is configured to move translationally relative to the base in response to the contact shoe being displaced while sliding.

7. The apparatus of claim 1, wherein the linkage comprises a plurality of links, each of the plurality of links oriented parallel to the other links when the contact shoe and the sensor carriage are in a first position relative to the base and at least one of the plurality of links angled relative to another of the plurality of links when the contact shoe and the sensor carriage are in a second position relative to the base.

8. The apparatus of claim 7 further comprising a biasing element in biasing engagement with the sensor carriage to bias the sensor carriage toward the first position relative to the base.

9. The apparatus of claim 7, wherein two of the plurality of links are coupled to the base at corresponding base pivot points proximal a base central axis of the base and along one side of the base and another two of the plurality of links are coupled to the base at corresponding base pivot points proximal the base central axis along an opposite side of the base.

10. The apparatus of claim 1, further comprising a fluid port formed in the contact shoe and configured to facilitate fluid contact at an ultrasonic unit of the sensor carriage.

11. A system for ultrasonic inspection, the system comprising:
   an apparatus comprising:
      a base comprising a first part contact surface;
      a contact shoe located within the base in a nested arrangement with the base and movably coupled to the base such that the contact shoe is translationally movable relative to the base;
      a sensor carriage located within the contact shoe in a nested arrangement with the contact shoe and movably coupled to the contact shoe such that the sensor carriage is translationally movable relative to the contact shoe, the sensor carriage comprising an ultrasonic unit; and
      a linkage pivotably coupled to the base at a base pivot point, pivotably coupled to the contact shoe at a shoe pivot point, and pivotably coupled to the sensor carriage at a carriage pivot point, wherein translational movement of the contact shoe relative to the base causes the linkage to pivot about the base pivot point, the shoe pivot point, and the carriage pivot point and move the sensor carriage relative to the base and the contact shoe;
   a tool to receive the apparatus and position the apparatus to provide an ultrasonic signal from the ultrasonic unit and detect a reflected ultrasonic signal at the ultrasonic unit; and
   a processing unit configured to process the reflected ultrasonic signal received by the ultrasonic unit to determine a presence of an abnormality corresponding to the positioning of the apparatus.

12. The system of claim 11, wherein the tool is configured to position the apparatus using a sliding motion.

13. The system of claim 12, wherein the sliding motion is in a sliding direction and the contact shoe and the sensor carriage are translationally movable in a displacement direction which is non-parallel to the sliding direction.

14. The system of claim 11, wherein the tool supplies an ultrasonic fluid to a fluid port of the apparatus.

15. The system of claim 11, wherein the tool comprises a robot.

16. A method of ultrasonic testing, the method comprising:
   positioning an apparatus on a part at a joint of the part to contact a first part contact surface of a base of the apparatus with the part and to contact a second part contact surface of a contact shoe of the apparatus at a first radius of the joint;
   emitting an ultrasonic signal from the apparatus to a focal point proximate the joint of the part;
   sliding the apparatus along the joint of the part with the first part contact surface in contact with the part;
   moving the contact shoe of the apparatus relative to a base of the apparatus in response to the second part contact surface of the contact shoe contacting a second radius of the joint; and
   actuating a linkage in response to movement of the contact shoe to move a sensor carriage of the apparatus to adjust a position of the focal point of the ultrasonic signal based on the second radius, the second radius being different from the first radius.

17. The method of claim 16, wherein the contact shoe moves a shoe translation distance and the sensor carriage moves a carriage translation distance that is greater than the shoe translation distance.

18. The method of claim 17, wherein the shoe translation distance corresponds to the carriage translation distance based on a shoe pivot point and a carriage pivot point along at least one link of the linkage.

19. The method of claim 16, wherein actuating the linkage further comprises pivoting the linkage about a base pivot point of the base in response to the movement of the contact shoe.

20. The method of claim 16, further comprising continuously testing the joint through a transition from the first radius to the second radius.

* * * * *